US008425122B2

(12) United States Patent
Bohr et al.

(10) Patent No.: US 8,425,122 B2
(45) Date of Patent: Apr. 23, 2013

(54) ANGULAR CONTACT ROLLING-ELEMENT BEARING, ESPECIALLY DOUBLE ROW BALL ROLLER BEARING IN TANDEM ARRANGEMENT

(75) Inventors: Andreas Bohr, Herzogenaurach (DE); Horst Doeppling, Herzogenaurach (DE); Heinrich Hofmann, Schweinfurt (DE); Peter Martin, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 196 days.

(21) Appl. No.: 12/989,263

(22) PCT Filed: Apr. 2, 2009

(86) PCT No.: PCT/EP2009/053934
§ 371 (c)(1),
(2), (4) Date: Oct. 22, 2010

(87) PCT Pub. No.: WO2009/130119
PCT Pub. Date: Oct. 29, 2009

(65) Prior Publication Data
US 2011/0033149 A1 Feb. 10, 2011

(30) Foreign Application Priority Data
Apr. 24, 2008 (DE) .......................... 10 2008 020 547

(51) Int. Cl.
*F16C 33/36* (2006.01)
*F16C 19/38* (2006.01)
(52) U.S. Cl.
USPC ........... 384/568; 384/572; 384/548; 384/604; 384/613

(58) Field of Classification Search .................. 384/450, 384/491, 504, 510, 512–513, 548, 558, 568, 384/572, 609, 613–614, 604
See application file for complete search history.

(56) References Cited

U.S. PATENT DOCUMENTS

| | | | |
|---|---|---|---|
| 2003/0142893 A1 | 7/2003 | Joki et al. | |
| 2008/0166082 A1* | 7/2008 | Hofmann et al. | 384/613 |
| 2008/0304781 A1* | 12/2008 | Hofmann et al. | 384/558 |
| 2008/0310786 A1* | 12/2008 | Hofmann et al. | 384/548 |

FOREIGN PATENT DOCUMENTS

| | | |
|---|---|---|
| DE | 198 39 481 A1 | 3/2000 |
| DE | 10 2005 014 556 A1 | 10/2006 |
| DE | 10 2006 003 691 A1 | 8/2007 |
| DE | 10 2006 035 163 A1 | 1/2008 |
| DE | 102006057487 A1 * | 6/2008 |

(Continued)

*Primary Examiner* — Marcus Charles
(74) *Attorney, Agent, or Firm* — Lucas & Mercanti, LLP

(57) ABSTRACT

A double row roller bearing which has an outer and inner bearing ring and ball rollers, which have lateral faces and are arranged next to each other in rows, arranged between the bearing rings. The rollers roll in raceways incorporated into the inner face of the outer bearing ring and outer face of the inner bearing ring. The raceways run in parallel and have pressure angle axes that are pitched at a pressure angle relative to a bearing radial axis. The rollers have a distance relative to each other which excludes mutual frictional contacts. For this purpose, the distance of the pressure angle axes of the raceways is enlarged and both rows of rollers are guided in separate bearing cages, while the raceway of the rollers of the row with the larger reference circle arranged on the inner bearing ring has a one-sided axial extension using the distance.

9 Claims, 3 Drawing Sheets

FOREIGN PATENT DOCUMENTS

| | | | |
|---|---|---|---|
| DE | 102006060678 A1 * | 6/2008 | |
| DE | 102008020547 A1 * | 10/2009 | |
| DE | 102008037075 A1 * | 2/2010 | |
| EP | 1 361 373 A | 11/2003 | |
| WO | WO 2007000149 A1 * | 1/2007 | |
| WO | WO 2007065414 A1 * | 6/2007 | |
| WO | WO 2007065415 A1 * | 6/2007 | |
| WO | WO 2007076771 A1 * | 7/2007 | |
| WO | 2008/006338 A | 1/2008 | |
| WO | 2008/052875 A | 5/2008 | |

* cited by examiner

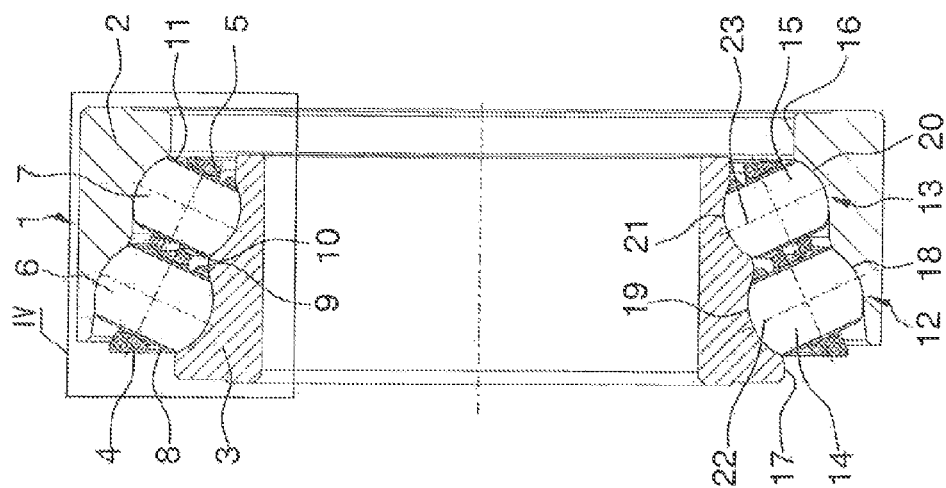
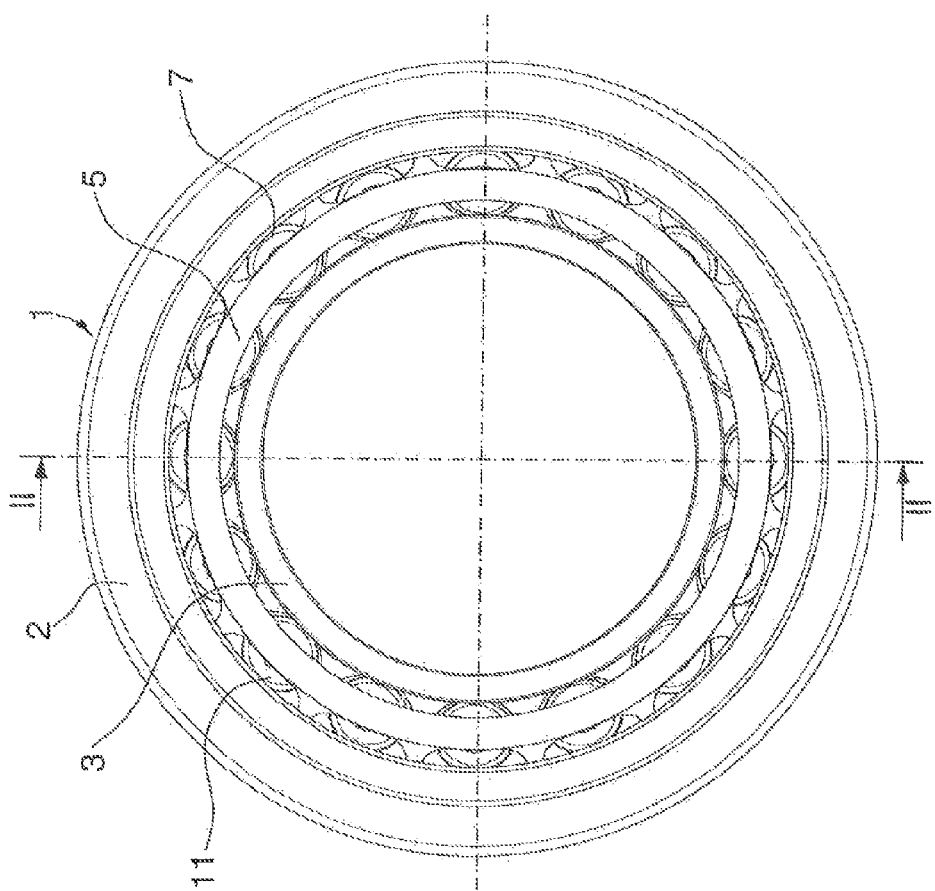

ANGULAR CONTACT ROLLING-ELEMENT BEARING, ESPECIALLY DOUBLE ROW BALL ROLLER BEARING IN TANDEM ARRANGEMENT

CROSS-REFERENCE TO RELATED APPLICATIONS

This application is a 371 of PCT/EP2009/053934 filed Apr. 2, 2009, which in turn claims the priority of DE 10 2008 020 547.8 filed Apr. 24, 2008, the priority of both applications is hereby claimed and both applications are incorporated by reference herein.

FIELD OF THE INVENTION

The invention relates to an angular contact rolling-element bearing and is applicable especially advantageously to double row ball roller bearings in tandem arrangement which are provided as a replacement for tapered roller bearings or angular contact ball bearings in tandem arrangement utilized hitherto at the same location.

BACKGROUND OF THE INVENTION

It is generally known to the person skilled in the art of rolling-element bearing technology that the support of shafts or hubs with axial and radial moment loading is usually effected by means of angular contact rolling-element bearings which, on account of the high loading, are in most cases in the form of two oppositely disposed and axially preloaded tapered roller bearings. In cases where large axial forces arise, these tapered roller bearings are configured with a large pressure angle and ensure a high stiffness of the supported shaft.

However, since in such tapered roller bearings a sliding friction between the end face of the tapered rollers and the guide face of the bearing edge is brought about due to their preload, which results in wear on the tapered rollers and the bearing edge, it was proposed in DE 198 39 481 A1 to replace the tapered roller bearings by double row angular contact ball bearings in tandem arrangement that can be loaded on one side and are disposed in an O-arrangement relative to one another. The use of such angular contact ball bearings in tandem arrangement instead of tapered roller bearings was intended to achieve a substantially smaller frictional moment because of the sliding friction no longer present between the bearing balls and the raceway shoulders, so that the wear and the temperature of the bearing are reduced and its efficiency is improved.

Nevertheless, such a replacement of tapered roller bearings by double row angular contact ball bearings in tandem arrangement has proved disadvantageous in practice, since these angular contact ball bearings in tandem arrangement require increased axial installation space, in comparison to tapered roller bearings, on account of the adjacently arranged raceways for the bearing balls and the large diameter of the bearing balls needed to achieve the required load capacity. Moreover, if such an angular contact ball bearing in tandem arrangement is to have a higher load capacity than a tapered roller bearing, costly changes to the bearing seats are necessary, disadvantageously increasing the production costs of the component concerned. Furthermore, such double row angular contact ball bearings in tandem arrangement give rise to increased manufacturing and material outlay when producing the bearings, as compared to tapered roller bearings, so that their production costs are likewise increased.

To avoid these disadvantages, it was therefore proposed in DE 10 2005 014 556, with regard to a double row angular contact rolling-element bearing consisting in a known fashion of an inner and an outer bearing ring, to configure the rolling bodies arranged between the bearing rings of each row as ball rollers with two respective lateral faces arranged parallel to one another and flattened symmetrically from a spherical basic shape, instead of bearing balls, and to arrange the two rows one beside the other with a vertical offset, in a similar manner to angular contact ball bearings in tandem arrangement with different reference circle diameters. In this case the ball rollers of the row on the larger reference circle have a larger diameter in their spherical basic shape than the ball rollers of the row on the smaller reference circle, and the two rows are retained at uniform distances from one another in the circumferential direction by a common bearing cage, with reciprocal guidance of the respective adjacent ball rollers. In addition, the ball rollers of both rows run with their running faces in two respective adjacent groove-shaped raceways in the outer and the inner bearing ring, which raceways have pressure angle axes disposed parallel to one another and are arranged contiguously to one another in such a manner that the respective adjacent ball rollers of both rows are arranged on a common axis of rotation disposed perpendicularly to the pressure angle axes. The use of ball rollers as rolling bodies is intended to distinguish such an angular contact rolling-element bearing from multi-row angular contact ball bearings primarily by a minimized axial and radial installation space, and by an equal or increased load capacity with comparable manufacturing costs.

However, it has proved in practice, in the case of the ball roller bearing in tandem arrangement proposed in DE 10 2005 014 556, that the intended synchronous running between the ball rollers arranged in a common cage pocket, resulting from the common axis of rotation of the respective adjacent ball rollers of the two rows, is lost under certain load conditions, with the consequence that friction arises between the lateral faces oriented towards one another of the respective adjacent ball rollers, as a result of different rotational speeds. If these unfavorable load conditions occur for relatively long periods or at short time intervals, this friction between the ball rollers causes a considerable temperature rise in the bearing, which can result in defective lubrication at the rolling contact and even in rupturing of the lubricating film and failure of the bearing. In addition, the direct merging of the raceways of the ball rollers, especially in the inner bearing ring, has also proved disadvantageous for the bearing kinematics, since this merging, especially in the case of a pressure angle which decreases as a result of load changes during operation of the bearing, causes the edge portions of the ball rollers of the row on the larger reference circle to slew slightly out of their raceway and therefore to have only a reduced contact area with their raceway. This in turn has the result that the pressure ellipse in the raceway resulting from the bearing load is at least partially truncated and that the ball rollers run on the edge of their raceway, resulting in damage to the running faces of the ball rollers and to their raceway.

OBJECT OF THE INVENTION

Starting from the disadvantages of the known prior art which have been described, it is therefore the object of the invention to design an angular contact rolling-element bearing, especially a double row ball roller bearing in tandem arrangement, in which the friction which occurs under certain load conditions between the lateral faces oriented towards one another of the respective adjacent ball rollers, and the reduction in the contact area of the ball rollers with their raceways which occurs in the event of a diminishing pressure angle, are excluded.

DESCRIPTION OF THE INVENTION

This object is achieved according to the invention by an angular contact rolling-element bearing in which respective adjacent ball rollers of two rows have a distance from one another which excludes mutual frictional contact through enlargement of the distance between the pressure angle axes of their raceways and through guidance of the two rows of the ball rollers in two separate bearing cages, and in that at least the raceway, arranged on the inner bearing ring, of the ball rollers of the row with the larger reference circle is configured on one side with an axial extension which utilizes the distance.

The invention is therefore based on recognition of the fact that a purposeful separation, or mutually spaced axial arrangement, of the two rows of the ball rollers makes it possible in a simple manner to eliminate the disadvantages which have arisen hitherto in operation of the bearing, without substantially increasing the axial space requirement of the ball roller bearing in tandem arrangement.

Preferred configurations and developments of the angular contact rolling-element bearing according to the invention are described in the dependent claims.

Accordingly, it is provided in the angular contact rolling-element bearing according to the invention that the diameter of the ball rollers of the row on the larger reference circle is preferably larger than the diameter of the ball rollers of the row with the smaller reference circle, and the respective adjacent ball rollers of the two rows have their own respective axes of rotation which are arranged offset vertically from one another in the radial direction. In this case, the configuration of the ball rollers of the two rows with different diameters has proved especially advantageous with respect to the radial and axial forces to be absorbed, it also possibly being advantageous, depending on the application of the inventively configured angular contact rolling-element bearing, to configure both rows of ball rollers with equal diameters. However, the arrangement of the two rows of ball rollers on axes of rotation offset vertically from one another in a radial direction has proved useful for optimizing the arrangements of the raceways in the bearing rings and for utilizing ball rollers with standard dimensions, and is made possible because synchronous running of the respective adjacent ball rollers of the two rows is no longer provided and the two rows are guided in separate bearing cages. Nevertheless, an arrangement of the respective adjacent ball rollers of the two rows on a common axis of rotation is also possible with the separate cage guidance of the two rows of ball rollers, and is therefore not to be excluded from the extent of the protection of the invention.

The inventively configured angular contact rolling-element bearing is further distinguished by the fact that the separate bearing cages thereof have contours which are nested at least partially one inside the other, and that the raceway, arranged on the inner bearing ring, of the ball rollers of the row with the smaller reference circle is also configured with an axial extension on one side, in this case the configuration of the bearing cages with contours nested one inside the other serves the purpose of reducing to a minimum the greater axial installation space required by the adjacently arranged bearing cages, while the axial extension on one side of the raceway of the ball rollers of the row with the smaller reference circle, as well as the extension of the raceway of the ball rollers of the row with the larger reference circle, serves to enlarge the contact areas of the ball rollers with their raceways in the event of changes of the pressure angle during operation of the bearing. In this case, the raceways in the outer bearing ring also have corresponding extensions on their respective sides located diagonally opposite the raceway extensions on the inner bearing ring, the extensions of the raceways in the inner bearing ring preferably being configured with a radius in cross section, while the extensions of the raceways in the outer bearing ring are disposed linearly in cross section in the axial direction and serve primarily to facilitate assembly of the bearing.

As an advantageous development of the bearing cages of the rolling-element bearing configured according to the invention, it is further proposed that the two bearing cages of the ball roller bearing are preferably in the form of plastics window cages which consist respectively of a cage ring of larger diameter and a cage ring of smaller diameter, and of a plurality of cage webs connecting the cage rings to one another. The cage rings and the cage webs of the two bearing cages of the ball roller bearing together form fors respective individual cage pockets suitable for receiving the ball rollers, the contour of which matches in each case the cross-sectional contour of the ball rollers of the respective rows.

The formation of the nested contours of the two bearing cages is effected finally, in that the cage ring of smaller diameter of the bearing cage of the ball rollers of the row with the larger reference circle, and the cage ring of larger diameter of the bearing cage of the ball rollers of the row with the smaller reference circle, are dimensioned such that they are arranged one above the other in the assembly position of the bearing cages. The upper face of the cage ring of smaller diameter of the bearing cage of the one row of ball rollers, and the lower face of the cage ring of larger diameter of the bearing cage of the other row of ball rollers, are arranged at a distance from one another respectively in the plane of the axes of rotation of two adjacent ball rollers, in order thereby to exclude friction-inducing contact of the bearing cages.

BRIEF DESCRIPTION OF THE DRAWINGS

A preferred embodiment of the angular contact rolling-element bearing according to the invention is explained in more detail below with reference to the appended drawings, in which:

FIG. 1 is a top view of a ball roller bearing in tandem arrangement configured according to the invention;

FIG. 2 shows the cross section II-II through the inventively configured hall roller bearing in tandem arrangement shown in FIG. 1;

DETAILED DESCRIPTION OF THE DRAWINGS

Figure 3:
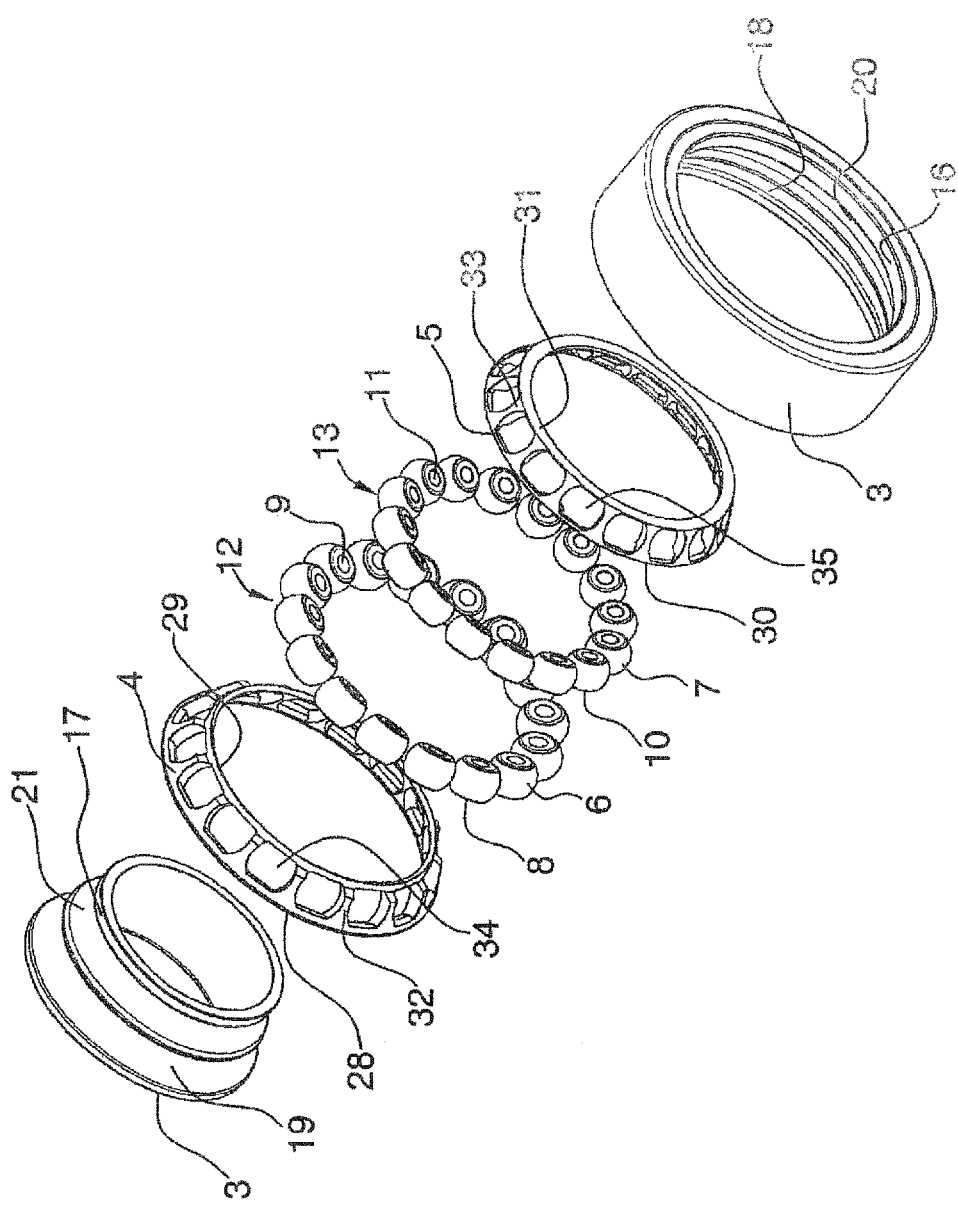
FIG. 3 is an exploded view of the inventively configured ball roller bearing in tandem arrangement.

Shown in FIGS. 1 to 3 are various views of an angular contact rolling-element hearing in the form of a ball roller bearing 1 in tandem arrangement, which consists essentially of an outer bearing ring 2 and an inner bearing ring 3, and of a plurality of ball rollers 6, 7 arranged between the bearing rings 2, 3 and held at uniform distances from one another in the circumferential direction. It can be clearly seen that these ball rollers 6, 7 each have two respective lateral faces 8, 9 and 10, 11 arranged parallel to one another and flattened symmetrically from a spherical basic shape and are arranged one beside the other and offset vertically from one another, in two rows 12, 13 with different reference circle diameters. The ball rollers 6, 7 of the two rows 12, 13 run with their running faces 14, 15 in two respective groove-shaped raceways 18, 19 and 20, 21 worked respectively into the inner face 16 of the outer bearing ring 2 and into the outer lace 17 of the inner bearing 3. In the example shown in the drawings, the raceways 18, 19 and 20, 21 have pressure angle axes 22, 23 extending parallel to one another and pitched at a pressure angle α with respect to a bearing radial axis, but they may also have different pressure angles α for optimum adaptation to particular operating conditions.

Figure 4:
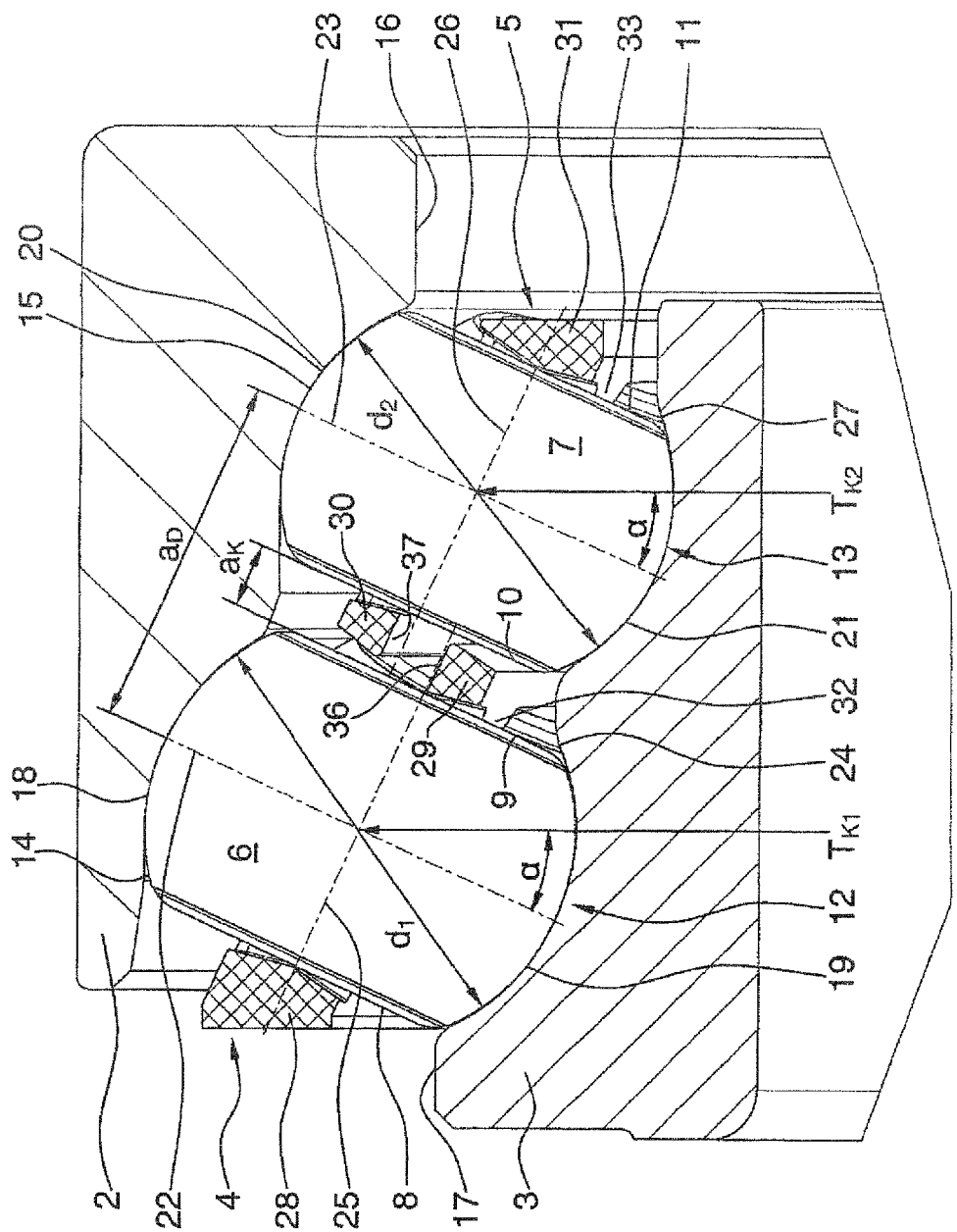
FIG. 4 is an enlarged representation of the detail IV of the inventively configured ball roller hearing in tandem arrangement shown in FIG. 1.

It is also clear from the detail IV in FIG. 2, shown in an enlarged scale in FIG. 4, that the pressure angle axes 22, 23 of the raceways 18, 19 and 20, 21 of the respective adjacent ball rollers 6, 7 of the two rows 12, 13 have, according to the invention, a distance $a_D$ from one another such that a distance $a_K$ which excludes mutual frictional contact is produced between the ball rollers 6, 7, and that guidance of the two rows 12, 13 of ball rollers 6, 7 is effected by two separate bearing cages 4, 5. The raceway 19, arranged on the inner bearing ring 3, of the ball rollers 6 of the row 12 with the larger reference circle $T_{K1}$ is additionally configured on one side with an axial extension 24 which utilizes the distance $a_K$ between the ball rollers 6, 7 and serves to enlarge the contact areas of the ball rollers 6 with their raceway 19 in the event of changing of the pressure angle α during operation of the bearing.

Furthermore, it can be seen from FIG. 4 that the diameter dx of the ball rollers 6 of the row 12 on the larger reference circle $T_{K1}$ is larger than the diameter $d_2$ of the ball rollers 7 of the row 13 with the smaller reference circle $T_{K2}$, and that the respective adjacent ball rollers 6, 7 of the two rows 12, 13 have their own respective axes of rotation 25, 26 arranged vertically offset from one another in the radial direction. The configuration of the ball rollers 6, 7 of the two rows 12, 13 with different diameters $d_1$, $d_2$ is especially advantageous with regard to the radial and axial forces to be absorbed, while the arrangement of the two rows 12, 13 of the ball rollers 6, 7 on axes of rotation 25, 26 radially offset vertically from one another is advantageous for optimizing the arrangement of the raceways 18, 19 and 20, 21 in the bearing rings 2, 3 and for the use of ball rollers 6, 7 of standard dimensions.

In addition, it can further be seen from the representation according to FIG. 4 that the separate bearing cages 4, 5 have contours which are partially nested one inside the other, by means of which the additional axial installation space required by the bearing cages 4, 5 arranged one beside the other is reduced to a minimum, and that the raceway 21, arranged on the inner bearing ring 3, of the ball rollers 7 of the row 13 with the smaller reference circle $T_{K2}$ is likewise configured with an axial extension 27 on one side which, like the extension 24 of the raceway 19 of the ball rollers 6 of the row 12 with the larger reference circle $T_{K1}$, serves to enlarge the contact areas of the ball rollers 7 with their raceway 21 in the event of changes of the pressure angle α during operation of the bearing.

It is also clear from FIG. 3 that the two bearing cages 4, 5 of the bail roller bearing 1 in tandem arrangement are in the form of plastics window cages which consist respectively of a cage ring 28, 30 of larger diameter and a cage ring 29, 31 of smaller diameter, and of a plurality of cage webs 32, 33 connecting the cage rings 28, 29 and 30, 31 to one another. In this case the cage rings 28, 29 and 30, 31 and the cage webs 32, 33 of the two bearing cages 4, 5 together form respective individual cage pockets 34, 35 suitable for receiving the ball rollers 6, 7 and having a contour matching the respective cross-sectional contour of the ball rollers 6, 7 of the respective row 12, 13.

The formation of the contours, nested one inside the other, of the two bearing cages 4, 5 is effected finally, as again shown in FIG. 4, in that the cage ring 29 of smaller diameter of the bearing cage 4 of the ball rollers 6 of the row 12 with the larger reference circle $T_{K1}$, and the cage ring 30 of larger diameter of the ball rollers 7 of the row 13 with the smaller reference circle $T_{K2}$, are dimensioned such that the cage rings 29, 30 are arranged one above the other in the assembly position of the bearing cages 4, 5. In this case the upper face 36 of the cage ring 29 of smaller diameter of the bearing cage 4 of the row 12 of the ball rollers 6, and the lower face 37 of the cage ring 30 of larger diameter of the bearing cage 5 of the row 13 of the ball rollers 7, are arranged at a distance from one another respectively in the plane of the axes of rotation 25, 26 of two adjacent ball rollers 6, 7, in order to exclude friction-inducing contact of the bearing cages 4, 5.

LIST OF REFERENCES

1 Ball roller bearing in tandem arrangement
2 Outer bearing ring
3 Inner bearing ring
4 Bearing cage for 6
5 Bearing cage for 7
6 Bali rollers
7 Ball rollers
8 Lateral face of 6
9 Lateral face of 6
10 Lateral face of 7
11 Lateral face of 7
12 Row of 6
13 Row of 7
14 Running faces of 6
15 Running faces of 7
16 Inner face of 2
17 Outer face of 3
18 Raceway of 6 in 16
19 Raceway of 6 in 17
20 Raceway of 7 in 16
21 Raceway of 7 in 17
22 Pressure angle axis of 12
23 Pressure angle axis of 13
24 Extension of 18
25 Axis of rotation of 6
26 Axis of rotation of 7
27 Extension of 20
28 Cage ring of 4
29 Cage ring of 4
30 Cage ring of 5
31 Cage ring of 5
32 Cage webs of 4
33 Cage webs of 5
34 Cage pockets in 4
35 Cage pockets in 5
36 Lower face of 29
37 Upper face of 30
α Pressure angle
$a_D$ Distance between 22 and 23
$a_K$ Distance between 5 and 6
$T_{K1}$ Reference circle of 12
$T_{K2}$ Reference circle of 13
$d_1$ Diameter of 6
$d_2$ Diameter of 7

The invention claimed is:

1. An angular contact bearing, comprising:
an outer bearing ring;
an inner hearing ring; and
a plurality of ball rollers arranged in two rows between the bearing rings, the ball rollers in each of the two rows being held at uniform distances from one another in a circumferential direction by two separate bearing cages,
the ball rollers each have two respective lateral faces arranged parallel to one another which are flattened symmetrically from a spherical basic shape and are arranged with a vertical offset one beside the other in the two rows with different reference circle diameters,
the ball rollers of the two rows running with running faces in two respective groove-shaped raceways worked into an inner face of the outer bearing ring and into an outer face of the inner bearing ring, the raceways having pressure angle axes pitched at a pressure angle with respect to a bearing radial axis,
wherein adjacent ball rollers of the two rows have a distance from one another which excludes mutual frictional contact through enlargement of a distance between the pressure angle axes of the raceways and through guidance of the two rows of the ball rollers in the two separate bearing cages, and at least one of the raceways, arranged on the inner bearing ring, of the ball rollers of one of the two rows with a larger reference circle being configured on one side with an axial extension which utilizes the distance.

2. The angular contact bearing as claimed in claim 1, wherein a diameter of the ball rollers of the row on the larger reference circle is larger than a diameter of the ball rollers of the row with the smaller reference circle, and the ball rollers of the two rows each having axes of rotation which are arranged offset vertically from one another in a radial direction.

3. The angular contact bearing as claimed in claim 1, wherein the bearing cages of the ball roller bearing have contours which are nested at least partially one inside the other in order to reduce an axial space requirement, and the raceway, arranged on the inner bearing ring, of the ball rollers of the row with a smaller reference circle is likewise configured with an axial extension on one side.

4. The angular contact bearing as claimed in claim 3, wherein the two bearing cages of the ball roller bearing are plastic window cages which each comprise a cage ring of larger diameter, a cage ring of smaller diameter, and a plurality of cage webs connecting the cage rings to one another.

5. The angular contact bearing as claimed in claim 4, wherein the cage rings and the cage webs of the two bearing cages of the ball roller bearing together form respective individual cage pockets receiving the ball rollers and each of the cage pockets having a contour matching a cross-sectional contour of a respective one of the ball rollers of the two rows.

6. The angular contact bearing as claimed in claim 5, wherein the cage ring of smaller diameter of the bearing cage of the ball rollers of the row with the larger reference circle, and the cage ring of larger diameter of the bearing cage of the ball rollers of the row with the smaller reference circle, are arranged one above the other in the assembly position of the bearing cages.

7. The angular contact bearing as claimed in claim 6, wherein an upper face of the cage ring of smaller diameter of the bearing cage of the ball rollers, and a lower face of the cage ring of larger diameter of the bearing cage of the ball rollers, are arranged at a distance from one another respectively in a plane of axes of rotation of two adjacent ball rollers.

8. The angular contact bearing as claimed in claim 1, wherein the bearing is a double-row ball bearing.

9. The angular contact bearing as claimed in claim 1, wherein the axial extension enlarges the contact area of the bail rollers with the at least one of the raceways when the pressure angle is changed during operation of the bearing.

* * * * *